Figure 1:
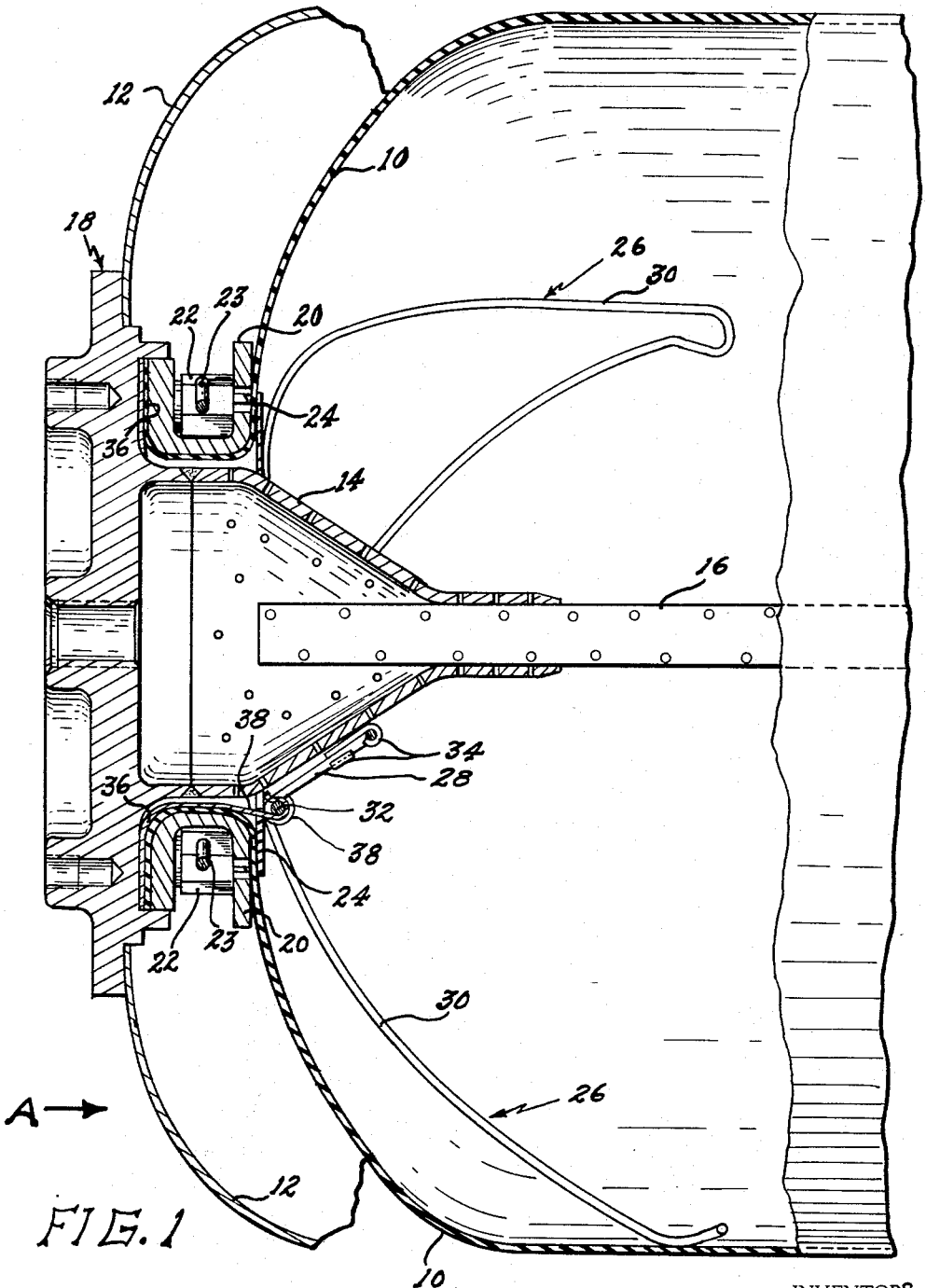

United States Patent Office 3,286,878
Patented Nov. 22, 1966

3,286,878
CONTROLLED FOLDING BLADDER
John R. Schadt, Niagara Falls, Frank A. Chapin and Durwood G. Anderson, Tonawanda, and Anthony J. La Bruna, Buffalo, N.Y., assignors to the United States of America as represented by the Secretary of the Air Force
Filed June 6, 1963, Ser. No. 286,098
6 Claims. (Cl. 220—85)

This invention relates to bladders for rocket propellant tanks and more particularly to a folding device for such a bladder.

In liquid propellant rockets, it is usual practice to force the propellant from the tank to the rocket motor by means of gas pressure. For this purpose free gas is introduced into the propellant tank. However, in the operation of guided rockets against aircraft or other rapidly moving targets, slosh takes place when rapid acceleration, deceleration, or sudden turns occur. If this occurs while the tanks are only partially full, the motion of the capsule will throw the liquid to the rear or to one side of the tank, uncovering the outlet and interrupting the flow of propellant to the motor. To reduce this, and to insure that the feed to the motor is always supplied with fuel, an improvement has been introduced in the form of a gas-containing bladder which expands as the supply of propellant decreases in the tank so that at all times the propellant is kept in constant contact with the outlet and the flow of fuel to the rocket motor is uninterrupted.

These bladders may also be used to contain the motor propellant, the gas being introduced into a tank surrounding the bladder. In this case, the bladder collapses as the supply of liquid fuel diminishes. When used to contain gas under pressure, as in the instant disclosure, the bladder is introduced into the tank at the time of assembly in collapsed condition. In either case, the bladder collapses in haphazard manner and sharp folds or peaks occur. These highly stressed areas may cause failure at any time. Particularly, these areas become highly critical at the low temperature conditions of liquid propellants.

The object of the present invention is, therefore, the elimination of these critical areas by providing a device and a method of folding each bladder as it collapses, so that its surface remains smooth.

This purpose is achieved by introducing a pair of spider-like elements into each end of the bladder, the elements having supporting members extending outwardly from the central axis of the tank, and co-ordinated so that the three arms at one end of the bladder are parallel to the three fingers or arms at the other end, to guide the folding into three large smooth folds. The paths of fingers support the bladder so that it will fold along three lines parallel to the axis of the tank. The folding thus produced is smooth and free of sharp folds and peaks. Nothing of the sort has been introduced into the art as presently known.

Another object of the invention is the provision of a device as described above and a method of installing the device in a liquid propellant tank.

A further object of the invention is the provision of a method of folding Teflon bladders used as liquid propellant containers, or as means introduced in liquid propellant tanks for keeping the fuel feed unobstructed.

Teflon bladders in which this invention has been introduced have been subject to large numbers of operational tests and it has been proven that the operational life of these bladders has been greatly increased.

A still further object of the invention is to control the collapse of the bladder by providing a device and method for supporting the bladder ends so that the folding takes place smoothly and without peaks and wrinkled areas. A further object of the invention is to provide a device for and method of folding such bladders in three large folds.

Figure 2:
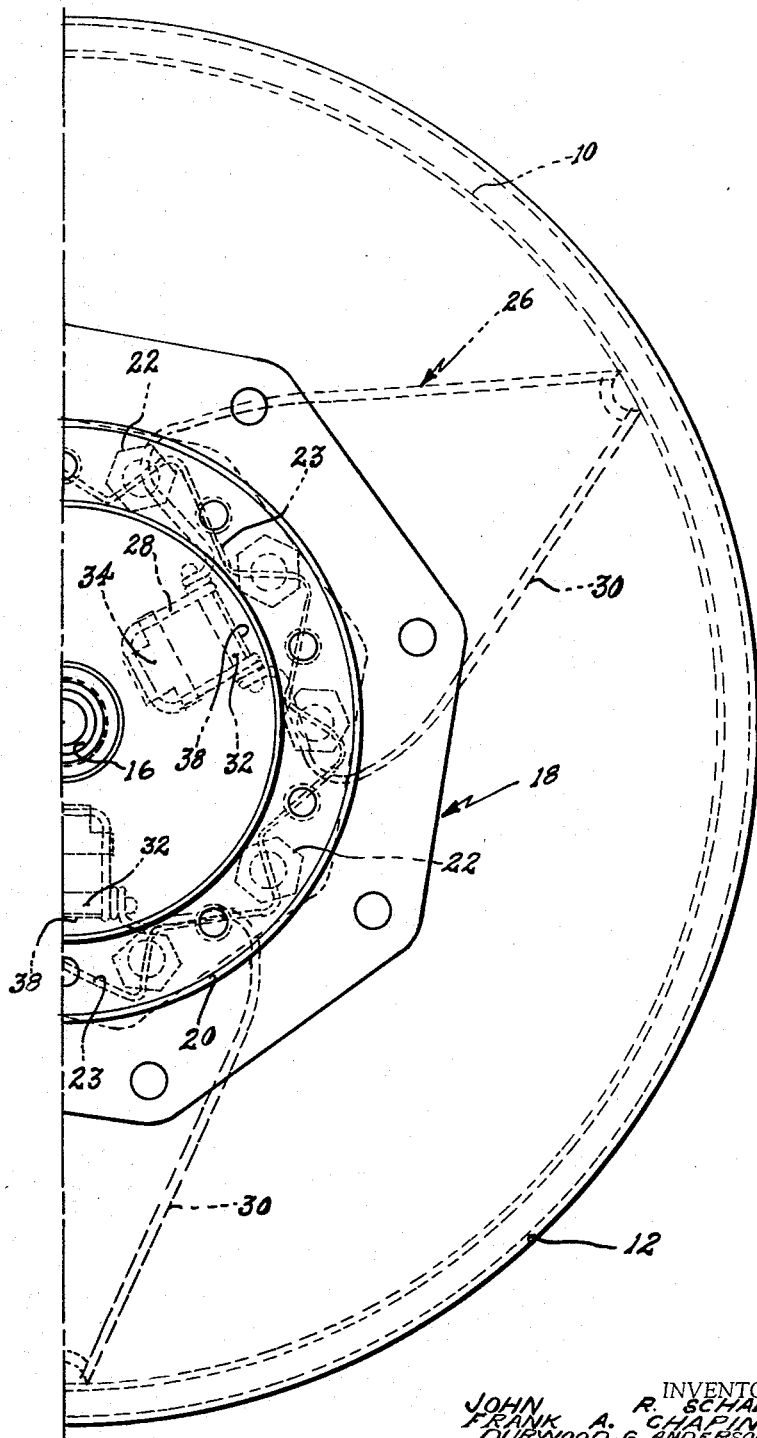
Figure 3:
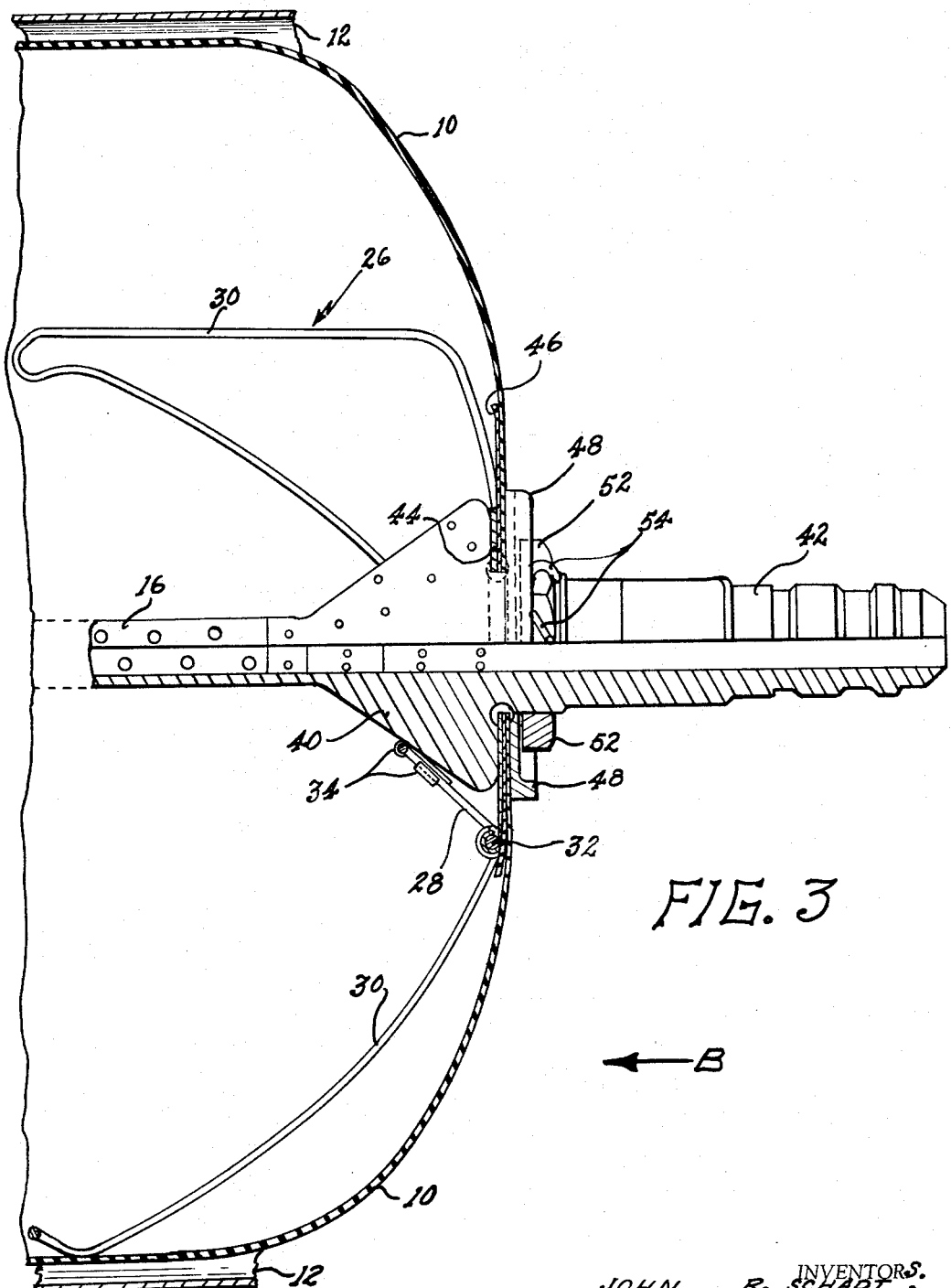
Figure 4:
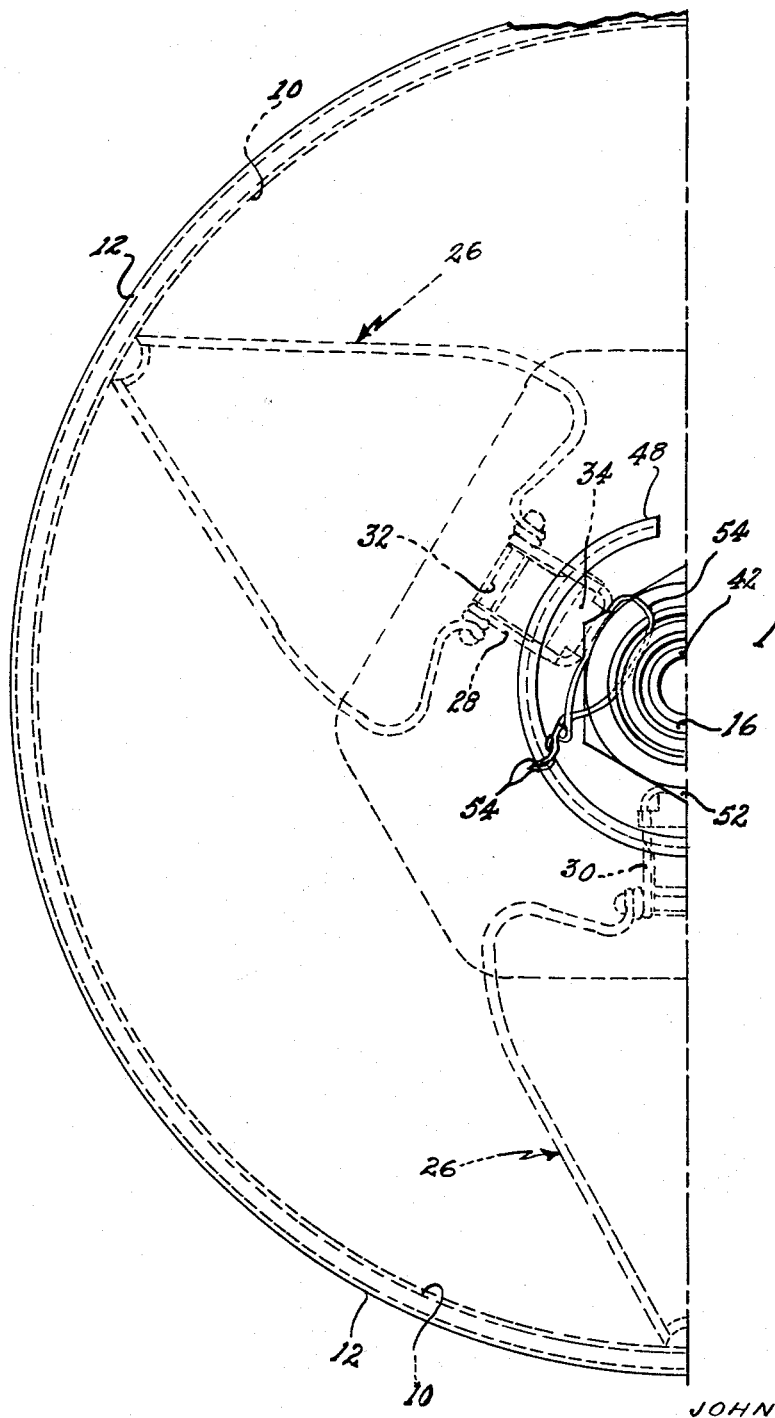
Figure 5:
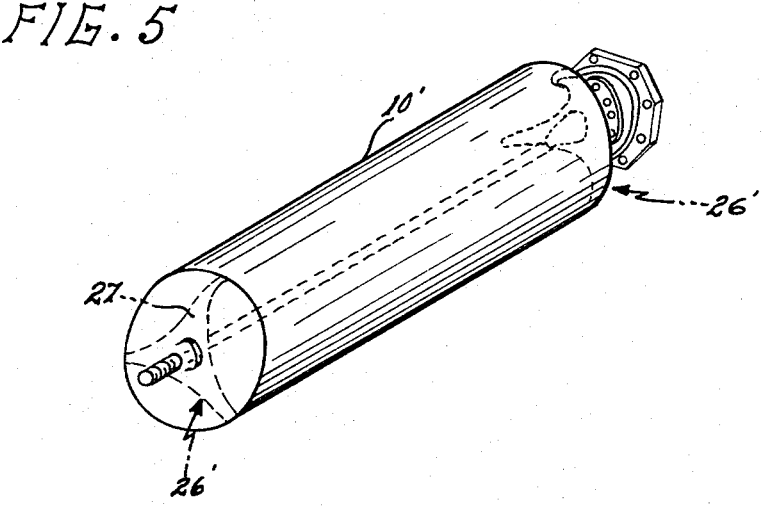
Figure 6:
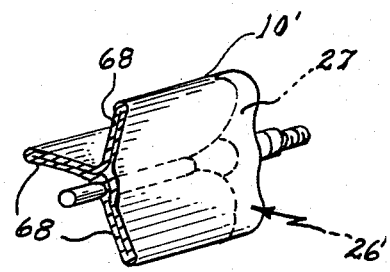

These and other advantages, features and objects of the invention will become more apparent from the following description taken in connection with the illustrative embodiments in the accompanying drawings, wherein:

FIGURE 1 is a cross-sectional view of the gas inlet end of the device and the installation assembly thereof;
FIGURE 2 is an end view of FIGURE 1 looking in the direction of the arrow A, in FIGURE 1;
FIGURE 3 is the view of the distal end of the bladder and bladder support partly in cross-section;
FIGURE 4 is an end view of FIGURE 3 looking in the direction of the arrow B in FIGURE 3;
FIGURE 5 is a perspective view of an entire inflated bladder showing a modified design of the bladder support; and
FIGURE 6 is a framentary view of the device as shown in FIGURE 5 showing the manner of folding.

Referring more in detail to the drawings, the bladder is designated as 10 in all of the figures. The material presently used for the bladder is Teflon, but any material having the necessary characteristics can be used within the scope of the invention. The bladder is secured into a tank 12 by suitable means at one or both ends in an air tight manner in such manner that the bladder remains intact and uninjured. In the example shown, the bladder is introduced into the tank 12 of liquid propellant in collapsed condition, when the cartridge unit is being prepared. In operation, as the propellant supply diminishes, a gas medium is introduced into the bladder through a perforated cone inlet 14 and an axially extending perforated tube 16. The cone 14 forms a sealing portion of the flange assembly 18, which is the last element of the capsule to be placed and adjusted.

It is to be understood however that the bladder could contain the liquid propellant and the gas be introduced into the tank around the bladder, collapsing it as the supply of propellant diminishes.

The invention deals with a method of supporting the bladder at its ends, to guide and control folding, whether it collapses or inflates during capsule operation.

These support elements 26, one for each of the bladder are each provided with three finger elements 30, adjusted to the shape of the bladder to control its folding. The general method of folding is shown in FIGURE 6. The invention is not limited, however, to this specific number of folds.

The finger assembly unit 26 comprises a spacing ring 36 and a set of closed wire loop elements of stainless steel spring tempered wire. Each loop is shaped into a configuration comprising finger segments 28 and 30. The connecting portions of the segments encircle and are held on a pin 32. The segment 30 of each of the supporting finger elements 26 fits the contour of the extended bladder, supports it, and determines the manner in which it is to fold. As the bladder collapses or inflates, the areas between these support elements fold or unfold smoothly. The segment 28 lies along the inlet cone 14. Tension is placed on the finger assembly at the time the capsule is assembled, a clip 34 on the loop segments 28 bearing against the cone 14. The retaining ring 36 is provided with three depending elements 38, one for each finger assembly. The elements 38 are formed to extend between the spaced portions of the loop segment 28 and encircle the pins 32. The elements 38, see FIGURE 1, are held in place by the channel shaped retaining element 20. Bolts 22 within channel 20 extend through element 36 and the bladder 10 to engage flange 18 thereby sealing the bladder to the flange. Lockwire 23 is threaded through bolts 22 to prevent loosening. The bladder cartridge is completed and sealed by the cone and flange element 18.

Referring to the opposite end of the capsule as shown in FIGURES 3 and 4, a retainer cone 40 and attached exhaust nozzle 42 is provided, which in operation of the charged capsule is closed. The three supporting finger assemblies are of the same construction as those shown in FIGURES 1 and 2 at the gas inlet end, with the exception of the steel retaining plate 44, corresponding to retaining ring 36 at the other end, the form of which is accommodated to the differing structure. The bladder opening is drawn in flat between the flat washer 48 and a ring pad 46, which may be an integral reinforced portion of the bladder. The plate 44 is held between the washer 48 and the flat outer surface of the retainer cone 40. A lock nut 52 and lock wire 54 complete the locking device as shown. Any efficient means can be used. The plate 44 has lugs thereon, encircling the pin 32 and extending between branches of the loops 28.

In the form of the device shown in FIGURES 5 and 6, the end supports 26' have integral finger elements 27. In the example shown, they are made of stainless steel sheet stock.

It is to be noted that, although the invention is not limited to a three finger support, calculations, testing and experience have shown that the triangular shape established by the three finger elements arranged in symmetry around the central axis of the bladder provides the best results and the high expulsion efficiencies presently being obtained on existing propellant bladder tanks, is not interfered with or decreased.

Although the invention has been described with reference to particular embodiments, it will be understood to those skilled in the art that the invention is capable of a variety of alternative embodiments within the spirit and scope of the appended claims.

We claim:
1. A device for controlling slosh in liquid propellant capsule units, said device comprising a tank for containing liquid propellant, a collapsible bladder containable in said tank in collapsed condition when the capsule is fully charged with liquid propellant, a gas inlet to said bladder for inflating said bladder as the propellant diminishes in said tank, and means for effecting controlled folding and unfolding of said bladder along predetermined fold lines.

2. A device for controlling slosh in liquid propellant capsule units, said device comprising a tank for containing liquid propellant, a collapsible bladder containable in said tank in collapsed condition when the capsule is fully charged with liquid propellant, a gas inlet to said bladder for inflating said bladder as the propellant diminishes in said tank, and means for effecting controlled folding and unfolding of said bladder along predetermined fold lines, said last named means comprises an element placed inside said bladder at each end thereof, radially extending fingers on each of said elements, said elements so located that pairs of fingers, the individuals of each pair being located on opposed end elements, are parallel, so that the folding and unfolding of the bladder takes place between said pairs of fingers in large smooth folds.

3. A device for controlling the folding of a plastic bladder subjected to external and internal pressures, said device comprising an inflatable and deflatable bladder, a support element insertable in each end of a bladder, three radially extending fingers on each of said elements, said elements being adjustable to provide parallel pairs of fingers, one of each pair being located at distal ends and internally of said bladder.

4. The method of preventing failures in, and increasing the life of, seamless Teflon bladders used in liquid propellant capsules for controlling slosh, said method comprising supporting said inflated bladder in three radially extending areas on each end of said bladder, each individual supported area on one end of said bladder being in substantial parallelism with a like supported area on the other end of said bladder, deflating and folding said bladder, said folding being controlled by said supported areas so that smooth controlled folding of said bladder is effected in three large folds.

5. The method of folding and unfolding of inflatable bladders used for controlling slosh in liquid propelled capsules, said method comprising supporting a plurality of radially extending areas at one end of said bladder, supporting a like number of radially extending areas located at the opposite end of said bladder, each located on one end of said bladder extending in parallelism with an individual supported area located on the opposite end of said bladder and, effecting smooth folding and unfolding of said bladder in a plurality of large folds extending parallel to the axis of said bladder, and in response to change of pressure differential occurring inside and outside of said bladder.

6. The method of preventing failures in, and increasing the life of inflatable and deflatable bladders, said method comprising supporting radially extending areas located on each end of said bladder, individual ones of said supported areas at one end of said bladder extending in parallelism with individual ones of said supported areas located on the opposite end of said bladder, smooth controlled folding and unfolding of said bladder occurring in six large smooth folds, three at the largest circumference and extending parallel to the axis of said bladder, alternate folds lying adjacent said axis and parallel thereto.

References Cited by the Examiner

UNITED STATES PATENTS

| 2,648,196 | 8/1953 | Mullen et al. | 60—35.6 |
| 2,816,419 | 12/1957 | Mueller | 60—39.48 |
| 2,844,938 | 7/1958 | Longwell | 60—39.48 |
| 2,940,256 | 6/1960 | Conyers et al. | 60—39.48 |
| 2,979,897 | 4/1961 | Studhalter et al. | 60—39.48 |
| 3,091,081 | 5/1963 | Alper et al. | 60—39.48 |
| 3,104,526 | 9/1963 | Hirschfield et al. | 60—39.48 |

BENJAMIN A. BORCHELT, *Primary Examiner.*

SAMUEL FEINBERG, *Examiner.*

G. L. PETERSON, G. H. GLANZMAN,
*Assistant Examiners.*